US012559072B2

(12) United States Patent (10) Patent No.: US 12,559,072 B2
Einig (45) Date of Patent: Feb. 24, 2026

(54) DECENTRALIZED CONTROL SYSTEM FOR A MOTOR VEHICLE BRAKING SYSTEM, MOTOR VEHICLE BRAKING SYSTEM AND MOTOR VEHICLE

(71) Applicant: ZF Active Safety GmbH, Koblenz (DE)

(72) Inventor: Frank Einig, Ochtendung (DE)

(73) Assignee: ZF Active Safety GmbH, Koblenz (DE)

( * ) Notice: Subject to any disclaimer, the term of this patent is extended or adjusted under 35 U.S.C. 154(b) by 85 days.

(21) Appl. No.: 18/484,515

(22) Filed: Oct. 11, 2023

(65) Prior Publication Data

US 2024/0116482 A1 Apr. 11, 2024

(30) Foreign Application Priority Data

Oct. 11, 2022 (DE) .......................... 102022126256.1
Aug. 18, 2023 (DE) .......................... 102023122197.3

(51) Int. Cl.
*B60T 8/17* (2006.01)
*B60T 8/172* (2006.01)
*B60T 8/1761* (2006.01)
*B60T 13/74* (2006.01)

(52) U.S. Cl.
CPC ............ *B60T 8/172* (2013.01); *B60T 8/1761* (2013.01); *B60T 13/741* (2013.01); *B60T 2270/10* (2013.01)

(58) Field of Classification Search
CPC ...... B60T 8/172; B60T 8/1761; B60T 13/741; B60T 2270/10; B60T 8/171; B60T 8/32; B60T 13/74
See application file for complete search history.

(56) References Cited

U.S. PATENT DOCUMENTS 6,317,675 B1    11/2001  Stolzl et al.
8,359,146 B2 *  1/2013   Amato ................ B60T 8/17554
                                                          701/70
(Continued)

FOREIGN PATENT DOCUMENTS

DE          19957632 A1     5/2001
EP          0780276 A2      6/1997
(Continued)

*Primary Examiner* — Joseph J Dallo
(74) *Attorney, Agent, or Firm* — Kristin L. Murphy

(57) ABSTRACT

A decentralized control system for a vehicle braking system, comprises: electrically controlled wheel braking devices, each comprising an electronic control device and an actuator which is electrically actuatable by the control device, and by which the individual wheel brakes are actuatable in a mutually independent manner; and wheel speed sensors for detecting a rotational wheel speed. A wheel speed sensor is assigned to each wheel of the motor vehicle, wherein at least one control device of the wheel braking devices is connected to all the wheel speed sensors and is designed to receive wheel speed information from all the wheel speed sensors. The at least one control device of the wheel braking devices is designed to determine a vehicle speed on the basis of wheel speed information thus received, together with a motor vehicle braking system and a motor vehicle.

14 Claims, 2 Drawing Sheets

(56)        References Cited

U.S. PATENT DOCUMENTS

| | | | |
|---|---|---|---|
| 2013/0268162 A1* | 10/2013 | Ponziani ................. | B60L 50/61 |
| | | | 701/99 |
| 2019/0337497 A1* | 11/2019 | Scheuerell .............. | B60T 8/171 |
| 2020/0031357 A1* | 1/2020 | Ling ......................... | B60L 7/10 |
| 2021/0370895 A1* | 12/2021 | Hwang ................... | B60T 8/885 |
| 2021/0380088 A1* | 12/2021 | Yoo ....................... | B60T 17/221 |
| 2021/0394728 A1* | 12/2021 | Yoo ....................... | B60T 8/4081 |
| 2022/0144338 A1* | 5/2022 | Scheuerell ............ | B60T 8/1755 |

FOREIGN PATENT DOCUMENTS

| | | | | |
|---|---|---|---|---|
| WO | WO-2009060090 A1 * | 5/2009 | .......... | B60L 15/2009 |
| WO | WO-2010128561 A1 * | 11/2010 | .............. | B60T 1/005 |
| WO | WO-2018045881 A1 * | 3/2018 | ............... | B60K 1/02 |

* cited by examiner

DECENTRALIZED CONTROL SYSTEM FOR A MOTOR VEHICLE BRAKING SYSTEM, MOTOR VEHICLE BRAKING SYSTEM AND MOTOR VEHICLE

CROSS-REFERENCE TO RELATED APPLICATION

This application claims priority to German Priority Application No. 102022126256.1, filed Oct. 11, 2022 and German Patent Application No. 102023122197.3, filed Aug. 18, 2023, the disclosure of which is incorporated herein by reference in its entirety.

TECHNICAL FIELD

The disclosure relates to a decentralized control system for a motor vehicle braking system. The disclosure further relates to a motor vehicle braking system, and to a motor vehicle.

BACKGROUND

U.S. Pat. No. 6,317,675 B1 describes an exemplary electromechanical braking system having a central module, which is connected to braking modules via a data transmission unit, and which determines a target braking value. EP 0 780 276 A2 further discloses a braking system having a central control device, which is connected to all wheel braking devices, wherein the braking function is controlled by the central control device.

In data communications between a central control device and the decentralized control devices of braking actuators, a two-fold latency or time lag can occur. However, the minimization of latency or time lags by the requisite data communications between the control device and local control devices of braking actuators is extremely important in braking systems. This is particularly relevant to highly time-critical regulation functions, such as wheel slip control e.g. for ABS, TC, ESC systems, etc. For each of these wheel slip control functions, knowledge of the exact vehicle speed over ground, or the "vehicle reference speed" is critical. It is therefore desirable that time lags associated with data communications for wheel slip calculations in a centralized or decentralized architecture should be reduced, but also that improved redundancy in order to accommodate failed system evaluations should be permitted, and that the execution of an improved wheel slip calculation should be possible, in the interests of an improved braking distance.

SUMMARY

What is needed is the structural and/or functional improvement of an above-mentioned control system. In addition, a structural and/or functional improvement of an above-mentioned vehicle braking system and/or of an above-mentioned motor vehicle is also needed.

A decentralized control system is disclosed herein.

A control system for a motor vehicle braking system is disclosed. The control system can be a decentralized control system. The control system can comprise and/or constitute a wheel slip control system. The motor vehicle braking system can be provided for a motor vehicle. The motor vehicle can be a passenger car or a heavy goods vehicle (HGV). The motor vehicle and/or the motor vehicle braking system can comprise wheel brakes, such as front wheel brakes and/or rear wheel brakes.

The control system can comprise wheel braking devices. The control system can comprise, for example, two or four wheel braking devices. Wheel braking devices can be electrically controlled wheel braking devices. Wheel braking devices can respectively comprise an electronic control device, for example braking control devices. Wheel braking devices can respectively comprise an actuator. The actuator can be, for example, an actuator which is electrically actuated by a control unit. Each wheel braking device can comprise an electronic control device and an actuator which is electrically actuatable by the control device. Wheel braking devices can be configured to actuate the individual wheel brakes in a mutually independent manner. Due to the wheel braking devices, the individual wheel brakes can be actuatable in a mutually independent manner. A wheel braking device can be assigned to each wheel brake. Each wheel brake can be actuatable by a respective actuator.

Control devices of the wheel braking devices can be employed and/or designed for use in a braking system. Control devices of the wheel braking devices can comprise an electronic controller. Control devices of the wheel braking devices can constitute or comprise an electronic control unit (ECU). Electronic controllers and/or control devices of the wheel braking devices can comprise a microcomputer and/or a processor. Control devices of the wheel braking devices can be control apparatuses, for example braking control apparatuses or EMB control apparatuses.

Wheel braking devices can be electromechanical wheel braking devices. Actuators of wheel braking devices can be electromechanical and/or electromotive actuators, for example braking actuators. Electromechanical and/or electromotive actuators or braking actuators can be configured to generate a force which acts on a brake disk of the braking system, such as a braking force, by the compression of the brake pad against the brake disk. Wheel braking devices and/or actuators, or braking actuators, can be assigned to an axle, such as a wheel axle, for example a front axle or rear axle of the motor vehicle, and/or can be arranged to act thereupon. For example, a wheel braking device and/or an actuator can be assigned to each wheel of the motor vehicle, and/or can be arranged to act thereupon. Wheel braking devices and/or actuators, or braking actuators, can be electromechanical and/or electromotive brakes, or an element thereof. The control system and/or braking system can be designed to be actuated by a driver of the vehicle and/or in a driver-independent manner. A braking process initiated by a driver by actuating a brake pedal can be described as service braking. In the context of service braking initiated by a driver, or independently thereof, a driving safety system and/or electronic stability control system can initiate a driver-independent braking process, or "system braking". System braking can assume a temporal overlap with service braking, or can be executed in a temporally separate manner from service braking. The control system can be the driving safety system and/or electronic stability control system, for example an ABS and/or TC and/or ESC control device, or an element thereof. The control system can be designed to execute an automatic activation of a braking process, such as system braking/system braking operation. In place of the term "wheel", both heretofore and/or hereinafter, the term "tyres" can be used.

The control system can comprise wheel speed sensors. Wheel speed sensors can be configured to detect a wheel speed. One wheel speed sensor can be assigned to each wheel of the motor vehicle. Wheel speed sensors can be configured to deliver a rotational speed and/or the wheel speed. The speed of individual wheels can be determined or established by wheel-specific rotational speed sensors or wheel speed sensors.

At least one control device of the wheel braking devices can be connected to all the wheel speed sensors. The at least one control device of the wheel braking devices can be designed to receive wheel speed information from all the wheel speed sensors. The at least one control device of the wheel braking devices can be designed to determine a vehicle speed on the basis, for example, of all wheel speed information received. The vehicle speed can be the speed of the motor vehicle over ground.

Each control device of the wheel braking devices can be connected to all the wheel speed sensors. Each control device of the wheel braking devices can be designed to receive wheel speed information from all the wheel speed sensors. Each control device of the wheel braking devices can be designed to determine the vehicle speed on the basis, for example, of all wheel speed information received.

The at least one, or each control device of the wheel braking devices can be designed to determine the vehicle speed on the basis of a combination, weighting or delimitation, etc., of all available rotational wheel speed information or wheel speeds.

Rotational wheel speed information can comprise information on wheel speed. The at least one, or each control device of the wheel braking devices can be designed to determine the wheel speed of each wheel on the basis of associated rotational wheel speed information. The at least one, or each control device of the wheel braking devices can be designed to determine the vehicle speed on the basis, for example, of all wheel speeds.

The at least one, or each control device of the wheel braking devices can be connected to the wheel speed sensors via a communication system and/or can execute the mutual exchange of data. Wheel speed sensors can be configured, via the communication system, to deliver and/or transmit rotational wheel speed information or wheel speed information to the at least one, or to each control device of the wheel braking devices. The communication system can be a bus system, for example a Controller Area Network (CAN), Flexray or Ethernet.

Control devices of the wheel braking devices can be interconnected. For example, control devices of the wheel braking devices can be interconnected via the communication system and/or can execute the mutual exchange of data.

The control system can further comprise a central control device. The central control device can be connected to the at least one, or to each control device of the wheel braking devices, for example by the communication system. The central control device can be employed and/or designed for use in a braking system. The central control device can comprise an electronic controller. The central control device can constitute or comprise an electronic control unit (ECU). The electronic controller and/or the central control device can comprise a microcomputer and/or a processor. The control device can be designed to deliver and/or transmit information or control signals/commands to the at least one, or to each control device of the wheel braking devices. This information can comprise vehicle information, driving status information, driver intention information, braking information, braking status, environmental information and/or similar. The central control unit can comprise one or more sensors and/or can be connected to the latter, which sensor(s) can capture one or more parameters, such as vehicle parameters, or information, and/or can execute the delivery thereof to the central control unit.

Each control device of the wheel braking devices can be designed to deliver and/or transmit the vehicle speed determined by the latter to the at least one, or to each of the other control devices of the wheel braking devices. The at least one control device of the wheel braking devices can be configured as a vehicle speed observer for observing and/or monitoring the specified vehicle speed or vehicle speeds, and/or can comprise an observer of this type.

The at least one control device of the wheel braking devices can be designed to determine, for example, an individual braking torque for the wheel which is assigned to the at least one control device, on the basis of the vehicle speed determined by the latter. Each control device of the wheel braking devices can be designed to determine, for example, an individual braking torque for the wheel which is assigned to the respective control device, on the basis of the vehicle speed which is determined by the respective control device. The braking torque can be a desired braking torque and/or a requested braking torque.

The at least one control device of the wheel braking devices can be designed to determine a, for example individual wheel slip of the wheel which is assigned to the at least one control device, on the basis of the vehicle speed determined by the latter and rotational wheel speed information and/or the wheel speed received for the wheel which is assigned to the at least one control device. Each control device of the wheel braking devices can designed to determine a, for example individual wheel slip of the wheel which is assigned to the respective control device, on the basis of the vehicle speed determined by the respective control device and rotational wheel speed information and/or the wheel speed received for the wheel which is assigned to the respective control device. The at least one, or each control device of the wheel braking devices can be designed to determine a, for example individual braking torque for the wheel which is assigned to the respective control device, on the basis of wheel slip determined by the respective control device. Wheel slip can be the relative difference between the vehicle speed, for example the vehicle reference speed, and the wheel speed. The wheel speed can be the rotational speed, which is converted into a longitudinal speed, for example as a standardized percentage value.

The at least one control device of the wheel braking devices can be designed to actuate the actuator which is assigned to the at least one, or to the respective control device, in order to deploy braking on the basis of the braking torque determined by the at least one, or by the respective control device.

The control system can thus be designed to transmit wheel speed information from each wheel speed sensor to each individual control device, such as the braking control apparatus, of the wheel braking devices, or to execute the delivery thereof, which information can then be employed for the calculation of the vehicle speed over ground, or the vehicle reference speed, and for the calculation of individual wheel slip, and thus for the calculation of the individual torque demand or braking torque demand.

A motor vehicle braking system can be employed and/or configured for a motor vehicle. The motor vehicle braking system can comprise a control system, for example a decentralized control system. The control system can be configured as described heretofore and/or as described hereinafter.

The motor vehicle braking system can comprise wheel brakes. One wheel brake can be assigned to each actuator of the wheel braking devices. Wheel brakes can comprise a brake pad and/or a friction lining. Actuators, for example electromechanical braking actuators, can be respectively configured to generate a force which acts on the brake disk of the braking system, such as a braking force, by the compression of the brake pad and/or the friction lining against the, for example, rotatably mounted brake disk.

Actuators, for example electromechanical braking actuators of the wheel braking devices, can be respectively configured to generate a tensile force in the brake pad or friction lining and/or to execute the transmission thereof to a brake block, in order to deploy braking. For example, actuators of the wheel braking devices can comprise a drive device such as, for example, an electric motor, and/or a drive unit for the transmission of the drive motion or drive force generated by the drive device to the brake pad or friction lining and/or to the brake block, such that braking is thus executed.

A motor vehicle can comprise a control system, for example a decentralized control system, such as for a braking system. The control system can be configured as described heretofore and/or as described hereinafter. The motor vehicle can comprise a motor vehicle braking system. The motor vehicle braking system can be configured as described heretofore and/or as described hereinafter. The motor vehicle can be a passenger vehicle or a heavy goods vehicle. The motor vehicle can comprise, for example, two or four wheels and/or two or tour wheel brakes.

In other words, a control system can be provided which is designed for a decentralized calculation of the vehicle speed over ground, or the vehicle reference speed, and/or for a decentralized wheel slip calculation on the basis of the vehicle reference speed. A vehicle speed over ground observer for decentralized wheel slip control systems can be provided. Disadvantages of the central calculation of the vehicle speed, or of a torque or braking torque demand calculation such as, for example, a two-fold communication or time lag, can be eliminated or significantly reduced. Time lags can be reduced. More accurate calculations can be executed. Redundancy in the event of failed system evaluations can be improved. An improved or more accurate wheel slip calculation can be executed, hi the interests of an improved braking distance.

BRIEF DESCRIPTION OF DRAWINGS

Exemplary arrangements of the disclosure are described in greater detail hereinafter with reference to the figures, wherein, in a schematic and exemplary manner.

DETAILED DESCRIPTION

Figure 1:
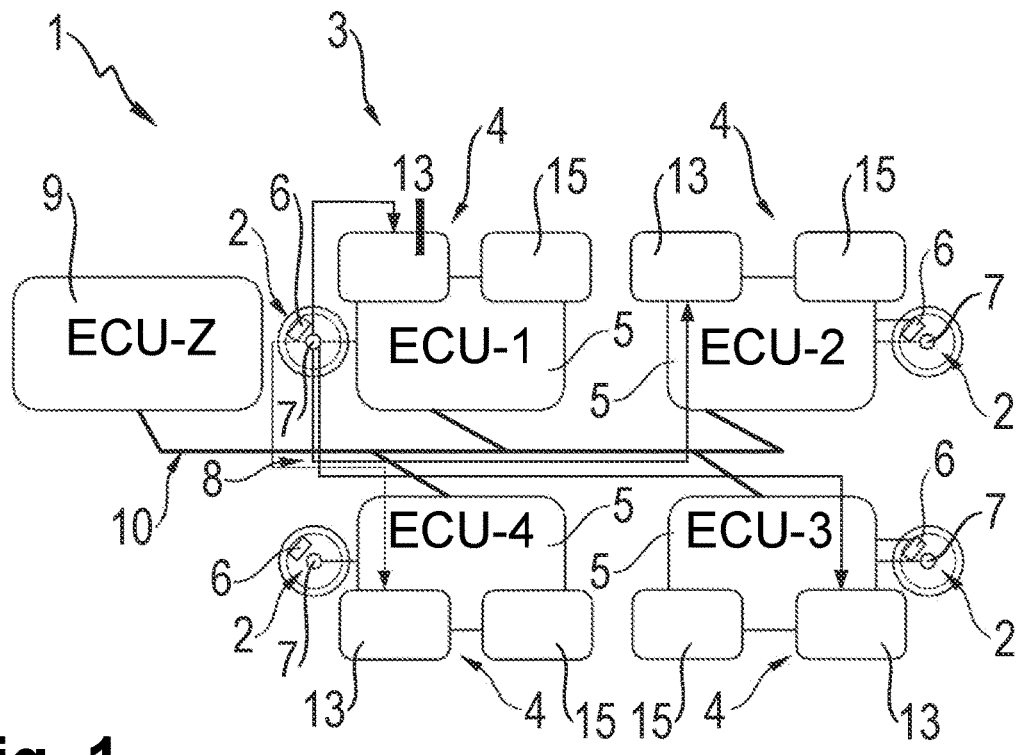
FIG. 1 shows a first exemplary arrangement of a motor vehicle braking system having a decentralized control system.

FIG. 1 shows a schematic representation of a first exemplary arrangement of a motor vehicle braking system 1 for a motor vehicle having wheel brakes 2 and a decentralized control system 3. The control system 3 can be configured as a wheel slip control system.

The control system 3 comprises electrically controlled wheel braking devices 4. Each of the wheel brake devices 4 comprises an electronic control device 5 (e.g. a "wheel individual brake ECU"), and an actuator 6 which is electrically actuated by the control device 5, which is assigned to a wheel brake 2 and is actuatable by the respective wheel brake 2. The actuators 6 are configured as electromechanical actuators.

The control system 3 further comprises wheel speed sensors 7 for detecting a wheel speed, wherein a wheel speed sensor 7 is assigned to each wheel of a motor vehicle.

At least one control device 5 of the wheel braking devices 4 is connected to all the wheel speed sensors 7. In the present exemplary arrangement, for example, this is the first device at the top left of FIG. 1 (ECU 1). The at least one control device 5 of the wheel braking devices 4 is designed to receive wheel speed information from all the wheel speed sensors 7, and to determine a vehicle speed (vREF) on the basis of wheel speed information received in block 13 (e.g. by a "vREF calculation"). The vehicle speed can be the vehicle speed over ground, or the vehicle reference speed. Rotational wheel speed information can already include information on wheel speed. Alternatively, the at least one control device 5 of the wheel braking devices 4 can be designed to determine the wheel speed of each wheel on the basis of associated rotational wheel speed information.

In an alternative arrangement, each control device 5 of the wheel braking devices 4 can be connected to all the wheel speed sensors 7, and can be designed to receive rotational wheel speed information from all the wheel speed sensors 7, wherein each control device 5 of the wheel braking devices 4 can be designed to determine a vehicle speed on the basis of rotational wheel speed information thus received.

As represented in FIG. 1, the control system 3 comprises a central control device 9 (ECU-Z), which is connected by a communication system 10 to the control devices 5 of the wheel braking devices 4. The central control device 9 is designed to deliver and/or transmit, to the at least one or to each control device 5 of the wheel braking devices 4, vehicle information 16 such as, e.g. driving status information ("drive state"), driver intention information ("driver demand"), braking information ("friction estimation"), environmental information and/or control signals. Additionally, all the control devices 5 of the wheel braking devices 4 can be interconnected by the communication system 10.

Moreover, the at least one control device 5 of the wheel braking devices 4 can be connected by a further communication system 8 to the wheel speed sensors 7. Additionally, all control devices 5 of the wheel braking devices 4 can be connected to all the wheel speed sensors 7 by the further communication system 8.

The at least one control device 5 of the wheel braking devices 4 is designed to determine an individual wheel slip of the wheel which is assigned to the at least one control device 5, on the basis of the vehicle speed determined (vREF) and rotational wheel speed information received or the wheel speed of the wheel which is assigned to the at least one control device. Each control device 5 of the wheel braking devices 4 can also be designed to determine an individual wheel slip of the wheel which is assigned to the respective control device 5, on the basis of the vehicle speed determined by the respective control device 5 and rotational wheel speed information received or the wheel speed of the wheel which is assigned to the respective control device 5.

Moreover, the at least one control device 5 of the wheel braking devices 4, according to block 15, is designed to determine an individual braking torque for the wheel which is assigned to the at least one control device 5, on the basis of the wheel slip thus determined (e.g. a "torque demand calculation"). Each control device 5 of the wheel braking devices 4 can also be designed to determine an individual braking torque for the wheel which is assigned to the respective control device 5, on the basis of the wheel slip which is determined by the respective control device 5.

The at least one, or each control device 5 of the wheel braking devices 4 is then designed to actuate the actuator 6 which is assigned to the at least one, or to the respective control device 5, in order to deploy braking on the basis of the braking torque which is determined by the at least one, or by the respective control device 5.

Figure 2:
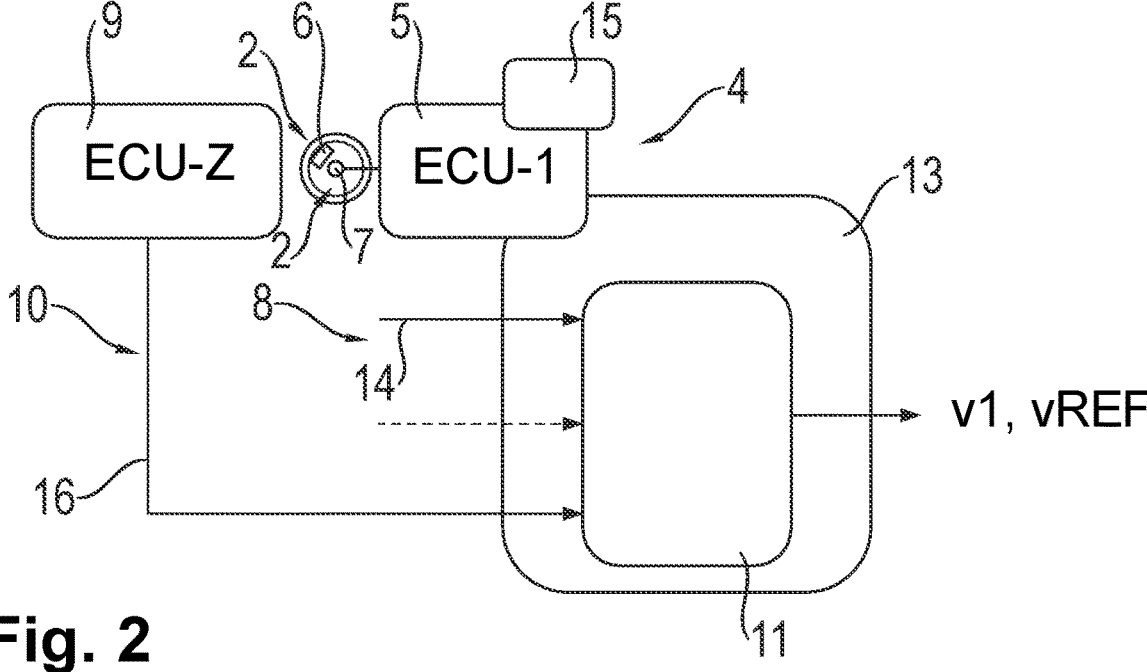
FIG. 2 shows schematic control devices of the decentralized control system according to FIG. 1.

FIG. 2 shows a schematic representation of the at least one control device 5 (ECU 1) of the wheel braking devices 4, and the central control device 9 (ECU-Z) of the decentralized control system 3 which is connected thereto by the communication system 10.

The at least one control device 5 of the wheel braking devices 4 is configured as a vehicle speed observer 11 for observing and/or monitoring the determined vehicle speed (vREF) or vehicle speeds. The central control device 9 can deliver and/or transmit vehicle information 16 to the observer 11 of the at least one control device 5, for example driving status information ("drive state"), driver intention information ("driver demand"), braking information ("friction estimation") or similar. Other control devices 5 of the wheel braking devices 4 can also deliver and/or transmit further vehicle information 14 to the observer 11 of the at least one control device 5, for example vehicle speeds determined (v1, v2, v3 and v4). The observer 11 can further be designed to receive rotational wheel speed information (n1, n2, n3 and n4) from the wheel sensors 7.

In all other respects, further reference may be made in particular to FIG. 1 and to the associated description.

Figure 3:
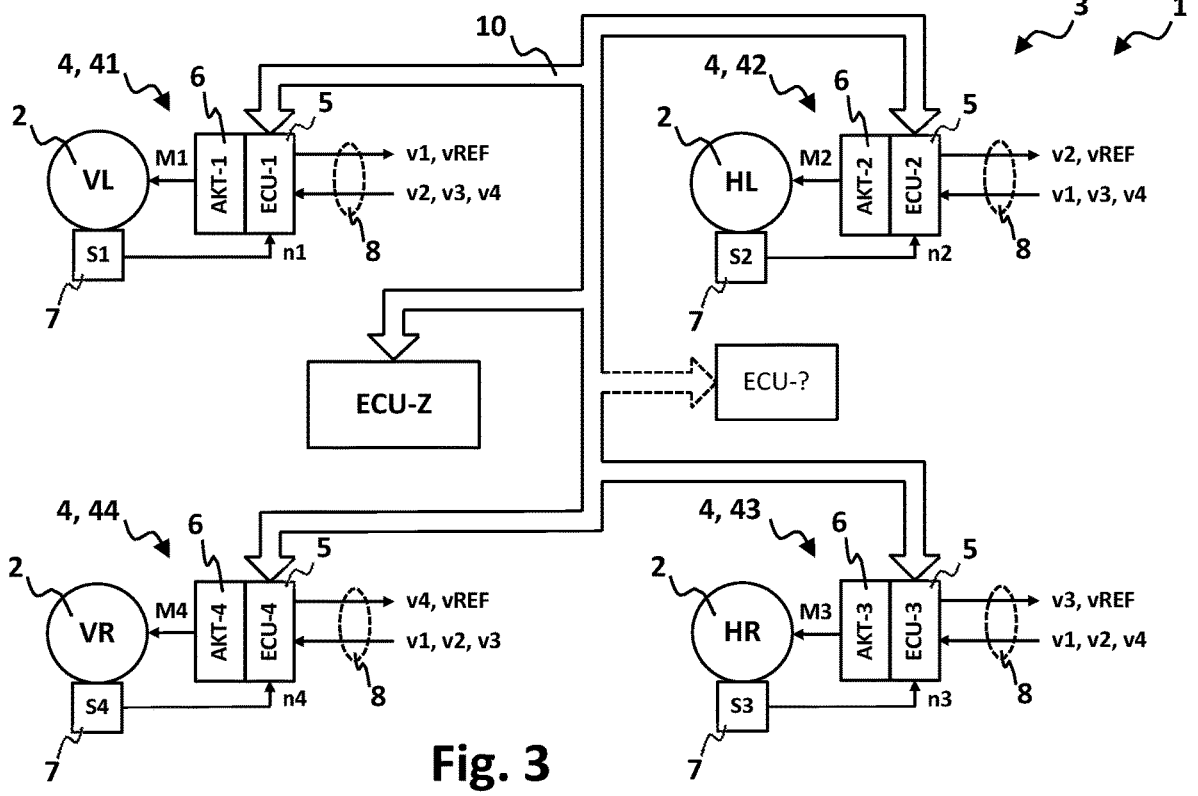
FIG. 3 shows a second exemplary arrangement of a motor vehicle braking system having a decentralized control system.

FIG. 3 shows a schematic representation of a second exemplary arrangement of a motor vehicle braking system 1 according to the disclosure for a motor vehicle having four wheels, and respectively four wheel brakes 2, VL (front left), HL (rear left), HR (rear right) and VR (front right).

The motor vehicle braking system 1 comprises a decentralized control system 3, and is of a modular design. To this end, a first wheel module 41 is assigned to the wheel VL, a second wheel module 42 to the wheel HL, a third wheel module 43 to the wheel HR and a fourth wheel module 44 to the wheel VR.

For the service braking function, the wheel modules 41, 42, 43 and 44 respectively comprise wheel braking devices 4, each of which comprises an electrically controllable braking actuator 6 (AKT-1, AKT-2, AKT-3 and AKT-4), an electronic control unit 5 (ECU-1, ECU-2, ECU-3 and ECU-4) and a sensor device 7 (S1, S2, S3 and S4).

Wheel modules 41, 42, 43 and 44 for the service braking function are of an essentially identical design.

Differences can occur, where individual wheel modules are designed to assume further vehicle functions. For the parking brake function, for example, it can be provided that the wheel module which is assigned to a vehicle axle comprises a further electrically controllable actuator component, in order to secure the wheel brakes when the vehicle is stationary. For the steering function, for example, it can be provided that the wheel module which is assigned to a vehicle axle comprises an electrically controllable steering actuator, in order to adjust the steering angle of the vehicle wheels. For the running gear function, for example, it can be provided that the wheel modules additionally comprise electrically controllable actuators, in order to adjust the shock absorber characteristic of the vehicle. For the drive function, for example, it can be provided that the wheel modules which are assigned to a vehicle axle comprise electric drive motors, in order to drive the vehicle wheels. As the above-mentioned examples indicate, wheel modules can thus be configured in a respectively differing manner, which according to the scope of vehicle functions or equipment.

The electronic control units ECU-1, ECU-2, ECU-3 and ECU-4 are designed and programmed, via a communication system 10, to interact, for example with a CAN bus (Controller Area Network). Relevant data or signals can thus be exchanged between the wheel modules 41, 42, 43 and 44.

The vehicle system also comprises a central electronic control unit ECU-Z, which is connected to the communication system 10, in order to permit interaction with the (decentralized) electronic control units ECU-1, ECU-2, ECU-3 and ECU-4. The central electronic control unit ECU-Z can thus exchange relevant data or signals with the wheel modules 41, 42, 43 and 44.

The central electronic control unit ECU-Z functions as a superordinate electronic control unit of the motor vehicle braking system 1. To this end, the central electronic control unit ECU-Z can be a standalone control unit, or a control unit which would otherwise be present in the vehicle, or a component of a control unit which would otherwise be present in the vehicle.

As a superordinate electronic control unit of the braking system, the central electronic control unit ECU-Z is designed and programmed to generate an output of a service braking request, To this end, in a known manner, the central electronic control unit ECU-Z evaluates, inter alia, actuations of a brake pedal by the driver, dynamic driving states of the vehicle such as, for example, the deceleration, acceleration and consumption behaviour thereof, external circumstances such as, for example, the friction coefficient and gradient of the carriageway, and the vehicle environment, including, for example, obstacles to the front, in proximity to, or to the rear of the actual vehicle.

It is further provided that electronic control units ECU-? of other vehicle systems can be connected to the communication system 10 (as indicated by broken lines). The central electronic control unit ECU-Z and the (decentralized) electronic control units ECU-1, ECU-2, ECU-3 and ECU-4 can thus additionally interact with electronic control units ECU-? of other vehicle systems, for example with the control unit of an engine control system, a transmission control system, a running gear control system and/or an environment monitoring system.

As the wheel modules 41, 42, 43 and 44 for the service braking function are essentially of an identical design, the functionality thereof is described in detail hereinafter with reference to the example of the first wheel module 41.

The sensor device S1 is employed to detect the wheel speed behaviour of the wheel VL which is assigned thereto, and delivers a corresponding wheel speed signal n1 to the electronic control unit ECU-1.

The electronic control unit ECU-1 is designed and programmed to evaluate the wheel speed signal n1 and, in consideration of vehicle parameters such as, for example, the rolling circumference, to determine the wheel speed v1 of the wheel VL which is assigned thereto, which is then output as a signal.

The wheel speed v1 delivered as a signal output is transmitted, via a further communication system 8 to the other electronic control units ECU-2, ECU-3 and ECU-4.

The electronic control unit ECU-1 is further designed and programmed to receive wheel speeds v2, v3 and v4, which are delivered as signal outputs by the other electronic control units ECU-2, ECU-3 and ECU-4, via the further communication system 8. Wheel speeds v1, v2, v3 and v4 of the individual wheels VL, HL, HR and VR of the vehicle are thus available within the electronic control unit ECU-1.

The electronic control unit ECU-1 is further designed and programmed, on the basis of the wheel speeds v1, v2, v3 and v4 of the individual wheels VL, HL, HR and VR, to determine the reference speed vREF of the vehicle, and to output the latter as a signal.

The braking actuator AKT-1 is employed for the generation of a braking torque M1, which is required for the actuation of the wheel brake VL which is assigned thereto, during a braking process.

For the actuation of braking actuator AKT-1, the electronic control unit ECU-1 which is assigned thereto is employed.

The electronic control unit ECU-1 is designed and programmed to control and/or regulate the braking torque M1 which is generated by the braking actuator AKT-1.

As the reference speed vREF of the vehicle is available within the electronic control unit ECU-1, the electronic control unit ECU-1 is designed and programmed, in consideration of the wheel speed v1 of the wheel VL which is assigned thereto, to determine the wheel slip behaviour of the wheel VL which is assigned thereto.

The electronic control unit ECU-1 is therefore designed and programmed to control and/or regulate the braking torque M1 which is generated by the braking actuator AKT-1 in accordance with the wheel slip behaviour of the wheel VL which is assigned thereto.

As indicated, on the grounds of the essentially identical design of the wheel modules 41, 42, 43 and 44, the preceding description of the wheel module 41 applies in the same manner to the wheel modules 42, 43 and 44. Analogies for the reference symbols employed in FIG. 1 are summarized in the following table for the wheel modules 41, 42, 43 and 44.

| Description | Wheel module 41 | Wheel module 42 | Wheel module 43 | Wheel module 44 |
|---|---|---|---|---|
| Wheel/Wheel brake | VL | HL | HR | VR |
| Control unit | ECU-1 | ECU-2 | ECU-3 | ECU-4 |
| Braking actuator | AKT-1 | AKT-2 | AKT-3 | AKT-4 |
| Braking torque | M1 | M2 | M3 | M4 |
| Sensor device | S1 | S2 | S3 | S4 |
| Wheel speed signal | n1 | n2 | n3 | n4 |
| Wheel speed | v1 | v2 | v3 | v4 |

In order to exchange wheel speeds v1, v2, v3, v4 and vREF as signals between the wheel modules 1, 2, 3 and 4, or the electronic control units ECU-1, ECU-2, ECU-3 and ECU-4, either the existing communication system 10, or a further standalone communication system 8 can be employed, such as, for example, a LIN bus (Local Interconnect Network). The employment of a further standalone communication system 8 permits a redundant interaction between the electronic control units ECU-1, ECU-2, ECU-3 and ECU-4, as a result of which a particularly high degree of system availability and system reliability is provided.

Alternatively, the further standalone communication system 8 can be formed by electric signal lines, via which the wheel speeds v1, v2, v3, v4 and, optionally, vREF can be transmitted as signals between the electronic control units ECU-1, ECU-2, ECU-3 and ECU-4.

A key advantage of a motor vehicle braking system according to the disclosure, having a decentralized control system, is thus provided in that, within each electronic control unit, not only the wheel speed of the wheel which is assigned thereto is available, but also the wheel speeds of the other wheels, such that a determination of the reference speed of the vehicle can be executed within each electronic control unit.

The term "can", in particular, describes optional features of the disclosure. Accordingly, further developments and/or exemplary arrangements of the disclosure can be provided which additionally or alternatively comprise the respective feature or respective features.

From the combinations of features disclosed herein, if required, individual features can also be extracted and, by the dissolution of any existing structural and/or functional association between features, can be employed in combination with other features in order to define the subject matter of a claim.

The invention claimed is:

1. A decentralized control system for a motor vehicle braking system, comprising:
   electrically controlled wheel braking devices, each comprising a respective electronic control device and an actuator which is electrically actuatable by the control device and configured to actuate an associated wheel brake independently of the other wheel brakes; and
   wheel speed sensors for detecting a rotational wheel speed, wherein a wheel speed sensor is assigned to each wheel of the motor vehicle, each wheel speed sensor outputting wheel-specific rotational speed information:
   wherein each of the electronic control devices is operatively connected to all of the wheel speed sensors via a vehicle communication network and is configured to receive rotational speed information from all of the wheel speed sensors;
   wherein each electronic control device is further configured to:
     (i) determine, based solely on the wheel-speed information from all of the wheel speed sensors, a vehicle reference speed;
     (ii) determine a slip value of the associated wheel from the vehicle reference speed and the wheel speed of the associated wheel; and
     (iii) determine a target braking torque for the associated actuator based on the slip value and directly control the associated actuator to apply the target braking torque;
   wherein the electronic control devices are interconnected via a communication link for redundant exchange of wheel-specific speed data and reference-speed data independently of a central vehicle control unit.

2. The control system according to claim 1, wherein the control system further comprises the central control device wherein the central control unit is configured to deliver and/or transmit vehicle information, driving status information, driver intention information, braking information, environmental information and/or control signals to the to at least one electronic control device.

3. The control system according to claim 1, wherein, each electronic control device of the wheel braking devices is designed to deliver and/or transmit the vehicle speed determined by the latter to at least one, or to each other electronic control device of the wheel braking devices.

4. The control system according to claim 1, wherein the at least one electronic control device of the wheel braking devices is configured as a vehicle speed observer for observing and/or monitoring the specified vehicle speed or vehicle speeds.

5. The control system according to claim 1 wherein the at least one electronic control device of the wheel braking devices is configured to determine, an individual braking torque for the wheel which is assigned to the at least one electronic control device, on the basis of the vehicle speed thus determined.

6. The control system according to claim 1, wherein each electronic control device of the wheel braking devices is configured to determine an individual braking torque for the wheel which is assigned to the respective electronic control device on the basis of the vehicle speed determined by the respective electronic control device.

7. The control system according to claim 1, the at least one electronic control device of the wheel braking devices is configured to determine, an individual wheel slip of the wheel which is assigned to the at least one electronic control device on the basis of the vehicle speed determined and the rotational wheel speed information and/or vehicle speed received for the wheel which is assigned to the at least one electronic control device.

8. The control system according to claim 1, wherein each electronic control device of the wheel braking devices is configured to determine an individual wheel slip of the wheel which is assigned to the respective electronic control device on the basis of the vehicle speed determined by the respective electronic control device and rotational wheel speed information received and/or the wheel speed of the wheel which is assigned to the respective electronic control device.

9. The control system according to claim 7 wherein the at least one, or each electronic control device of the wheel braking devices is designed to determine, in particular, an individual braking torque for the wheel which is assigned to the respective electronic control device, on the basis of wheel slip determined by the respective electronic control device.

10. The control system according to claim 9, wherein the at least one, or each electronic control device of the wheel braking devices is designed to actuate the actuator which is assigned to the at least one, or to the respective electronic control device, in order to deploy braking on the basis of the braking torque determined by the at least one, or by the respective electronic control device.

11. The control system according to claim 1, wherein the control system comprises a wheel slip control system.

12. The control system according to claim 1, wherein the wheel braking devices are electromechanical wheel braking devices and/or in that the actuators of wheel braking devices are electromechanical actuators.

13. A motor vehicle braking system for a motor vehicle, comprising a control system according to claim 1.

14. The motor vehicle braking system according to claim 13, further comprising wheel brakes, wherein one wheel brake is assigned to each actuator of the wheel braking devices.

* * * * *